United States Patent [19]

Smith, III

[11] 4,112,488

[45] Sep. 5, 1978

[54] FAULT-TOLERANT NETWORK WITH NODE BRANCHING

[75] Inventor: Thomas Basil Smith, III, Sudbury, Mass.

[73] Assignee: The Charles Stark Draper Laboratory, Inc., Cambridge, Mass.

[21] Appl. No.: 556,086

[22] Filed: Mar. 7, 1975

[51] Int. Cl.² .................. G06F 3/00; G06F 11/00; H04L 5/00
[52] U.S. Cl. .................................................. 364/200
[58] Field of Search ............... 340/172.5, 146.1 BE; 179/15 AL; 235/153 AE; 445/1; 364/200 MS File, 900 MS File

[56] References Cited

U.S. PATENT DOCUMENTS

| 2,493,256 | 1/1950 | Lundkvist | 179/15 AL X |
|---|---|---|---|
| 3,456,242 | 7/1969 | Lubkin et al. | 340/172.5 |
| 3,579,191 | 5/1971 | Andreae et al. | 340/172.5 |
| 3,597,549 | 8/1971 | Farmer et al. | 179/15 AL |
| 3,665,418 | 5/1972 | Bouricius et al. | 340/172.5 |
| 3,706,974 | 12/1972 | Patrick et al. | 340/172.5 |
| 3,710,026 | 1/1973 | Graham et al. | 179/15 AL |
| 3,731,002 | 5/1973 | Pierce | 340/172.5 X |
| 3,732,543 | 5/1973 | Rocher et al. | 340/172.5 |
| 3,735,362 | 5/1973 | Ashany et al. | 340/172.5 |
| 3,748,647 | 7/1973 | Ashany et al. | 340/172.5 |
| 3,772,656 | 11/1973 | Serracchioli et al. | 340/172.5 |
| 3,794,983 | 2/1974 | Sahin | 340/172.5 |
| 3,810,100 | 5/1974 | Hungerford et al. | 340/172.5 |
| 3,839,707 | 10/1974 | Woodward et al. | 340/172.5 |
| 3,879,710 | 4/1975 | Maxemchuk et al. | 340/172.5 |

OTHER PUBLICATIONS

Frush, "Graceful Degradation in a Multiple Data Path Environment", in IBM Tech. Discl. Bull., vol. 16, No. 3, Aug. 1973; pp. 912-914.

*Primary Examiner*—Melvin B. Chapnick
*Attorney, Agent, or Firm*—Robert F. O'Connell

[57] ABSTRACT

A network for providing data communication among a plurality of remote units and between such remote units and a central processor complex in which a plurality of node units are each associated with one or more remote units. The node units and central processor complex are interconnected by communications links, a selected number of such links being activated and each of the terminals of each node unit being assigned an appropriate status so that each node unit is in communication with the central processor complex through a unique path comprising one or more activated links. The configuration of activated communication lins can be rearranged periodically so that over a predetermined time period each of the links is activated at least once.

13 Claims, 18 Drawing Figures

FAULT-TOLERANT NETWORK WITH NODE BRANCHING

Introduction

This invention relates to a network system for providing communication among a plurality of separate units and, more particularly, to a network in which control of such communication resides in a central control unit, the network being capable of reconfiguration on a periodic basis and adaptable to maintain effective communication in the face of faults which may occur therein.

Background of the Invention

In the design of systems which provide communicating interconnections between one or more central control units and a plurality of remote units, it is desirable to provide a high degree of reliability at a reasonable cost. Reliability is a particular problem where such interconnections are subject to partial physical damage as, for example, by the collapse of support structures therefor due to fire, battle damage in combat situations, or any other common physical phenomena. Such system may include, for example, a central data processing complex and a plurality of remote units which may be other computer units or input/output peripheral units.

While a central processing complex often can be protected against massive physical damage by placing such a unit in a well structured, or well armored, location, the protection of the remote units of an overall system cannot be readily protected in many practical situations, particularly where the system is spread over a relatively large area. Further, the remote units may be in locations which are easily subject to damage, such as in aircraft systems where portions of the system must be located, for example, in the wings of the aircraft.

While the dispersion of units over a larger area offers some protection in itself, inasmuch as physical damage is unlikely to destroy the entire system all at once, the system may often be subjected to more limited, but nevertheless severe, forms of damage wherein certain units of the system either are destroyed themselves or become effectively isolated from the rest of the system by the destruction of the communications links with other portions thereof.

It is desirable, therefore, that the installation of an overall system, which may include a large number of remote units requiring communication both with a central processing unit and with each other, should be arranged so that the protection of the overall system can be as closely comparable as possible to the protection that can be provided for the central processing unit thereof, taking into account the cost, the weight and the size of the system and the units which are utilized therein.

Description of the Prior Art

Two approaches have generally been used in arranging an overall communication system to provide interconnections between a central processor complex and a plurality of remote devices. One such approach involves the use of dedicated, or fixed, wiring from the central unit to each of the remote devices. In systems where a large number of remote units are involved an enormous amount of the total weight and bulk of the system must be devoted to the wire itself and, moreover, the central processor complex must contain relatively complicated interface circuitry for the many wires which terminate there. The material and installation costs of such a system can become extremely large and in many cases the large number of remote devices that are used requires so much wiring that insufficient physical space is available therefor. Further, if the communicating link furnished by the dedicated wiring between a particular remote unit and the central processing complex is damaged, the remote unit becomes completely isolated even though it may remain undamaged in itself.

In order to overcome the cost and space problems associated with dedicated wiring systems, most modern computer control systems have resorted to the use of appropriate bus structures. Thus, for example, a single processor interface can be arranged to handle a time-multiplexed data bus to which all of the remote devices of the system are connected. The cost of wiring and the cost of the interface circuitry is effectively reduced to the cost of the single data bus and its central interface circuitry together with appropriate and relatively standardized interface circuitry at each of the remote devices. A bus system provides greater flexibility and expandibility than a dedicated wiring system in that the number of remote units can be readily increased by attaching the additional units on to the main bus at convenient points. No changes to the main frame wiring or to the interface at the central complex are thereby required and minimal adjustments to the bus routing are needed, particularly if the bus already passes near the newly added remote device.

Unfortunately, however, bus systems give rise to disadvantages in applications where damage to the system might occur. Thus, damage to the bus anywhere along its length generally disables the entire system and even the most minor of mishaps can reduce the system to inoperability. Such extreme vulnerability makes the use of bus systems undesirable if any reasonable degree of fault-tolerance is required.

Summary of the Invention

In order to overcome the problems associated with dedicated wire and bus systems, the invention utilizes a network configuration in which substantially all control of the communications between a central processing complex and a plurality of remote units, as well as communications among the remote units themselves, resides in the central processing unit. The network comprises a plurality of nodes and appropriate linking paths, i.e., communication links, between the nodes, and a central control unit connected to a selected number of the nodes. Each node can be used to service a single remote device or a small group of remote devices. Each of the nodes has at least two terminals, each connected to a linking path, with a selected number of nodes having at least three terminals, each connected to a linking path, so that an appropriate network configuration can be provided. Each node terminal is capable of being placed in a selected status for use as an input terminal, an output terminal, or an inactive terminal. For the purposes of this description the inboard side of an active linking path is defined as the end of the linking path which is nearest to the central control unit while an outboard side thereof is defined as the end thereof which is furthest from the central control unit.

The system includes means for appropriately activating a selected number of the linking paths which are provided between the nodes and between certain of the nodes and the central control unit, and for selectively assigning a suitable status to the terminal of each node so as to provide a network configuration in which each node unit is in communication with the central control unit through a unique route which includes one, or more, of the activated linking paths. The system can be further arranged to permit a change in the active network configuration by revising the assignment of activated linking paths and by appropriately reassigning the status of each node terminal. The system may be so arranged to reconfigure the network many times over a predetermined time period so that each linking path is activated at least once over such time period.

In accordance therewith, the overall network system thereby provides a reliable means for interconnecting the remote units with each other and with a central processor complex. Further, all of the decision-making is arranged to be performed at the central control unit with no decision-making required at any of the individual node units themselves. The information which is being sent from the central processor unit to the remote units, from a particular remote unit to the central unit, or from one remote unit to another, can be sent in serial form so that there is no need for any buffer storage capability at the node units. The node unit construction is thereby made relatively simple and inexpensive. Further, the system is readily adaptable to the incorporation of appropriate redundancy techniques in order to increase the reliability and to provide for error detection. Replicated redundancy is particularly suitable for use in the system of the invention due to its high degree of modularity and the potential economy which is possible in matching large scale integrated circuit technology thereto.

Description of the Invention

The invention can be described with more particularity with the assistance of the accompanying drawings wherein FIG. 1 depicts in diagrammatic form a network in accordance with the invention;

Figure 1:
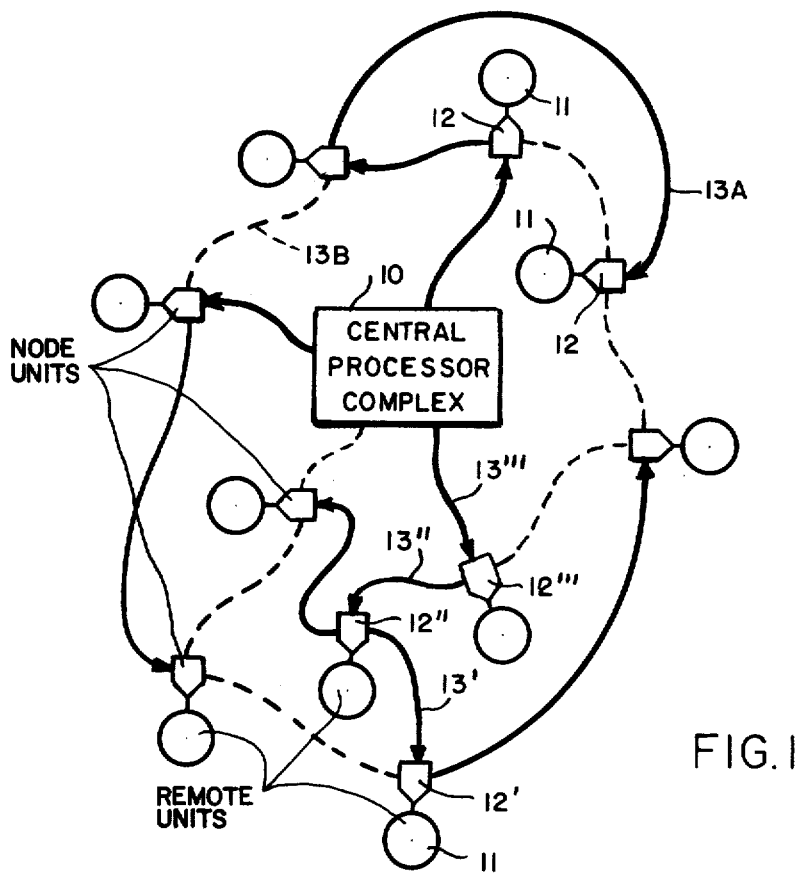

FIG. 1 depicts in relatively simplified form an exemplary network in accordance with the principles of the invention. As can be seen therein the network includes a central processor complex 10 and a plurality of remote units 11 which may be computer units or appropriate input/output devices, for example. Each of the remote units is appropriately connected to a single node unit 12, the purpose of which is described in more detail below.

A plurality of linking paths 13 interconnect the node units 12 and, further, interconnect a selected number of node units with the central unit 10. In the particular network configuration of FIG. 1, a selected number of such links, designated as links 13A, are placed in an active status, as shown by the solid lines, as explained more fully below, and a selected number thereof, designated as 13B, are placed in an inactive status, as shown by the dashed lines. Each active linking path 13 can be thought of as having an inboard side and an outboard side. Identification of the inboard and outboard sides of a particular active link can be made as follows. If a return path of active links is traced from the link in question to the central processor complex, the side of the link in question which is nearest the central processor complex along such return path is defined as the inboard side and the side of the link in question which is furthest therefrom is defined as the outboard side. In the figure an outboard side of a link is indicated by an arrowhead in order to distinguish it from the inboard side thereof. Inactive links are not provided with any specific orientation and the orientation of the inboard and outboard sides of a link are determined by the overall network assignment which is controlled by the central processing complex unit.

Each node 12 can be defined as having an inboard terminal which, for the purposes of this description, is defined as a terminal connected to the outboard side of an active link, and a variable number of outboard terminals which are defined as terminals connected to the inboard side of an active link. Terminals of each node unit 12 which are assigned neither an inboard nor an outboard status are said to be inactive (or null) terminals and are connected to inactive links. The assignment of the status of any particular terminal is controlled by the central processing unit 10 via control logic and such assignments may change if the overall network is reconfigured.

In the network as shown, a specific configuration has been selected by the central processor control unit 10 so that active and inactive links are appropriately defined as shown as well as the inboard and outboard sides thereof. Data communication is achieved exclusively from the central processor complex 10 to each of the remote nodes 12 and from the remote nodes to the central processor. There is no direct data communication path from one remote unit to another since all data communication therebetween must pass through the central processor control complex unit 10. Information from the processor is effectively broadcast on all active links leaving the processor and travels through the active links of the overall network to all nodes thereof. Thus, the direction of data information flow from the central unit 10 can be traced along the active links in the direction of the arrowhead so that all nodes 12 are ultimately reached thereby.

Messages from a remote unit are routed back to the processor from the node associated therewith along a single unique path which can be traced from a specific remote node 12 along one linking path in a direction against the arrowheads until the processor is reached. For example, a unique path is shown from the lowermost node unit of FIG. 1, designated as node 12', along a first linking path 13' to a second node unit 12" and thence along a linking path 13" to node 12'" and thence along linking path 13'" to the central unit 10.

Data from the central processor unit is transmitted serially, on a bit-by-bit basis, and need not be buffered or stored in any way at any intermediate point of the network, such as at any of the node units 12. As mentioned above, each of the linking paths 13 is assigned an active or inactive status and each of the terminals of nodes 12 has an inboard or an outboard status depending on which end of an active link it is connected to. Terminals which are connected to inactive links are likewise inactive. The assignments may be changed under the control of the central processor unit 10 to reconfigure the active network. In any one configuration a node unit 12 has only a single inboard terminal which is the terminal from which data information from the central unit 10 is received. Such data information is relayed on a bit-by-bit basis to all of the outboard terminals of the node for re-transmission on the active links connected thereto. No data information is relayed on any of the inactive links from the inactive terminals of the node units.

In the operation of the network in a reverse direction, i.e., where data information from a remote unit is to be relayed to the central unit 10 for use thereby or from re-transmission to another remote unit, such information from the outboard terminals of the node unit are ORed together and re-transmitted out the inboard terminal of the node unit. Since only one remote unit is transmitting at any one time, the ORing of such data information from incoming data paths can be accomplished without problem. Inactive terminals of a node unit normally do not receive or transmit any data information. All of the nodes and all of the linking paths of the network are fully duplexed, that is, each may handle data transmitted in both directions simultaneously.

The central processor complex unit 10 directly controls the conductivity of a particular node unit by sending control commands thereto over the network. Most of the node unit control command, such as a command to change the status of a node terminal from an inactive status, for example, to an outboard status are received by a node unit at its inboard terminal and processed by the node control portion of each node unit as described in more detail below. An exception to such a control command path is provided in the case of a command which is required to establish a new inboard terminal for a node unit. Such latter command does not normally arrive at the then current inboard terminal but rather arrives at the designated future inboard terminal, as described in more detail below.

An appropriate circuit at the node unit monitors the incoming command information and performs the appropriate function for each node control unit upon the detection of the command which is so received. Unlike the normal node unit commands, the specialized command discussed above for setting up a new inboard terminal is appropriately encoded so as to minimize the possibility of an erroneous triggering of the command decoding circuitry which circuitry might be exposed to random data from failed portions of the overall network.

The network provides fault tolerance effectively at two levels, which can be defined as the "macro" level and the "micro" level. The macro level fault tolerance is achieved by the basic ability to re-configure the overall network so as to bypass failed links or nodes. Accordingly, the macro level of fault tolerance is used as a means for overcoming massive damage which might completely destroy certain links, nodes, or entire regions of the overall network. By re-configuring the network it is possible to reroute the data information so as to avoid the damaged regions. The micro level of fault tolerance is achieved by providing basic redundancy at each single node unit or linking path. Such redundancy is provided because each remote unit is connected to the network at a single node unit and, therefore, each node unit must be designed to have sufficient redundancy to achieve the specified reliability requirements. The redundancy of each node unit raises the basic reliability of the building blocks of the network and guards against most normal component failures.

FIGS. 2-8 describe in more detail the node units 12 of FIG. 1. Each node unit is designed to be capable of verifying the correctness of any transmission which passes through the node. Further, each node unit must be able to record any errors which it recognizes and on command report such errors to the central processor complex. The node unit further is arranged to isolate itself from the effects of a faulty link despite the necessity for monitoring all incoming terminal assignment commands. It is further arranged to generate coordinated test conditions for all error modes so as to test the error detection circuitry of the surrounding nodes. Moreover, it is designed to maintain flexibility in the assignment of the conductivity of the node.

Each node, in a preferred embodiment, can be fabricated so as to provide redundant operation in order to increase the overall reliability thereof. In the specific embodiment of a typical node unit, as discussed herein, the node unit is connected to three other node units through appropriate linking paths, although the concepts described herein can be expanded to provide connections from one node unit to more than three other node units, as desired. Further, while the node unit specifically described is shown as having a redundancy level of three, such redundancy level can be reduced to two or increased to more than three without significantly altering the concepts involved. The use of replicated redundancy is helpful in order to avoid using coded redundancy techniques which may be more difficult to implement for purposes of providing the primary means of error detection. When using replicated redundancy a minimum redundancy level of at least two is required. Increased redundancy can be utilized to increase the node and link reliabilities.

Figure 2:
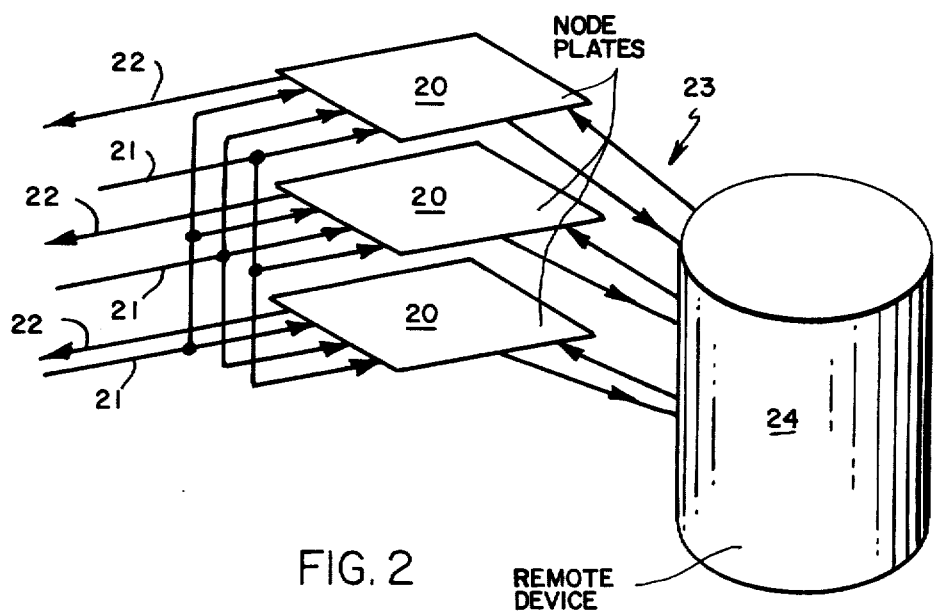
FIG. 2 depicts diagrammatically the relationship among the redundant circuits of a node unit of the network of FIG. 1.

As can be seen in FIG. 2, for triple redundancy each node utilizes three circuit sections which for convenience are depicted as separate integrated circuit packages, or plates, 20. Such plates may all be on the same integrated circuit module in a production system, for example. The data paths 21 are connected together among the plates 20 as shown and the redundant links 22 providing the connections to and from adjoining nodes are a natural result of the redundant nature of the node itself. Such duplication allows for easy determination of the sources of any errors. A plurality of interconnections 23 to a remote device 24 are present between each of the redundant node plates 20 and the associated remote device.

Figure 3:
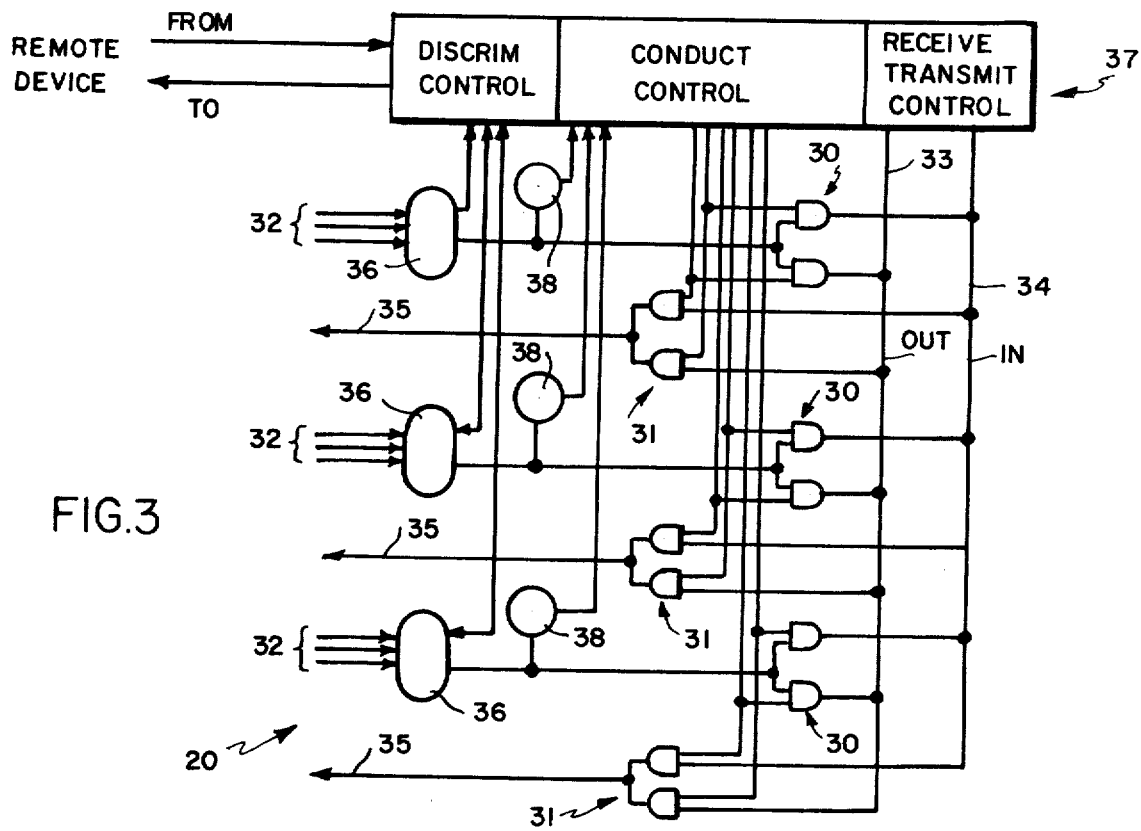
FIG. 3 depicts in more detailed form a portion of an exemplary node unit of the network of FIG. 1.

FIG. 3 illustrates a block diagram of a single node plate 20, the primary task thereof being to route any data coming from the inboard side of the node unit to the outboard side thereof or to the associated remote device and to route any data from the remote device to the inboard side. Such operation is done by selectively enabling the conductivity controls, as described in more detail below.

In FIG. 3 when a node terminal comprising input lines 32 and output line 35 is connected to the inboard side of a node it can transmit information to another node or receive information therefrom. Information arriving from another node for transmittal through the node to the central control unit arrives on such input lines 32 and is thereupon placed on the "IN" bus 34 within the node unit. Because of the triple redundancy technique used in the particular embodiment shown, three input lines are used, as discussed in more detail later. Such information which is destined for the central control unit is thereupon directly transmitted to the output line 35 of a node terminal which is converted to the outboard side of a link which conveys the information to the central control unit either directly or via intermediate nodes and links as required.

Information from the central processor control unit can be transmitted directly through a node, if such information is not intended for any of the remote devices associated with such node, via the inboard terminal of the node which is connected to the outboard side of a link carrying such information. Thus, such information arrives on input lines 32 thereof and is placed on the OUT bus 33 whence it is transferred directly to the outgoing line 35 of all outboard terminals connected to the inboard sides of other links which are in turn connected to the other nodes.

Information from the central control unit which is intended for a particular remote device arrives at the outboard side of a link to the input lines 32 of the inboard terminal of a node which services such remote device and is thereupon placed on the "OUT" bus 34 for appropriate transmittal to the remote unit. Information from a remote device is transmitted therefrom to the "IN" bus 34 of the node unit which services the remote device and thence to the output line 35 of an inboard terminal which is connected to the outboard side of a link which conveys the information to the central control unit directly or via intermediate nodes and links as required.

The input and output lines of the terminals of the node are organized so that the output from one plate 20 of the node unit drives a single data line 35 and the total number of redundant data output data lines from one side of the node unit is equal to the number of plates 20 in that node unit. All of the redundant input lines 32 into a side of the node unit are processed by the discriminators 36 of each node plate and are used to formulate a single correct data stream for use as the input signal to that plate. The disriminators are, in effect, voter devices of the type well known to those in the art and can include error detection circuitry also well known to those in the art. For example, the voter circuit may be of the form identified as majority logic gate unit MC14530 made and sold by Motorola, Inc., while the error detection circuitry may be of the form identified as exclusive-OR unit SN74136 made and sold by Texas Instruments, Inc. which can be used to provide a set of outputs for identifying which of the inputs agree and which one or more of the inputs disagree with the majority, or of the form identified as comparator unit DM8131 made and sold by National Semiconductor, Inc. to provide a simple disagreement or error signal showing that at least one of the inputs disagrees with the majority. Thus, the outputs from the discriminators 36 are made available to a node control unit 37 a part of which appropriately controls the operation of the discriminators over suitable control lines. When only three inputs are supplied to the discriminators 36, substantially no control need to be provided by the node control unit 37 since the discriminator operates in an appropriate manner for providing its output as is well known with respect to such voter discriminator operation. If, however, more than three input lines are required for certain types of redundancy techniques, some control over the selection of which redundant lines are to be examined by the discriminator may be necessary and such control is exercised by the discriminator control circuitry.

The output of each discriminator 36 is continuously monitored by an appropriate monitor circuit 38 which comprises suitable decoding logic for recognizing a specific coded message from the central processor complex when such coded message is contained in the input signal therefrom for instructing the node unit to set up that terminal as the inboard terminal of the node. Such messages from the central processor complex are appropriately encoded and are decoded by unit 38 to produce the appropriate instructions for controlling the node conductivity via the node control unit 37 as discussed more fully below.

Figure 9:
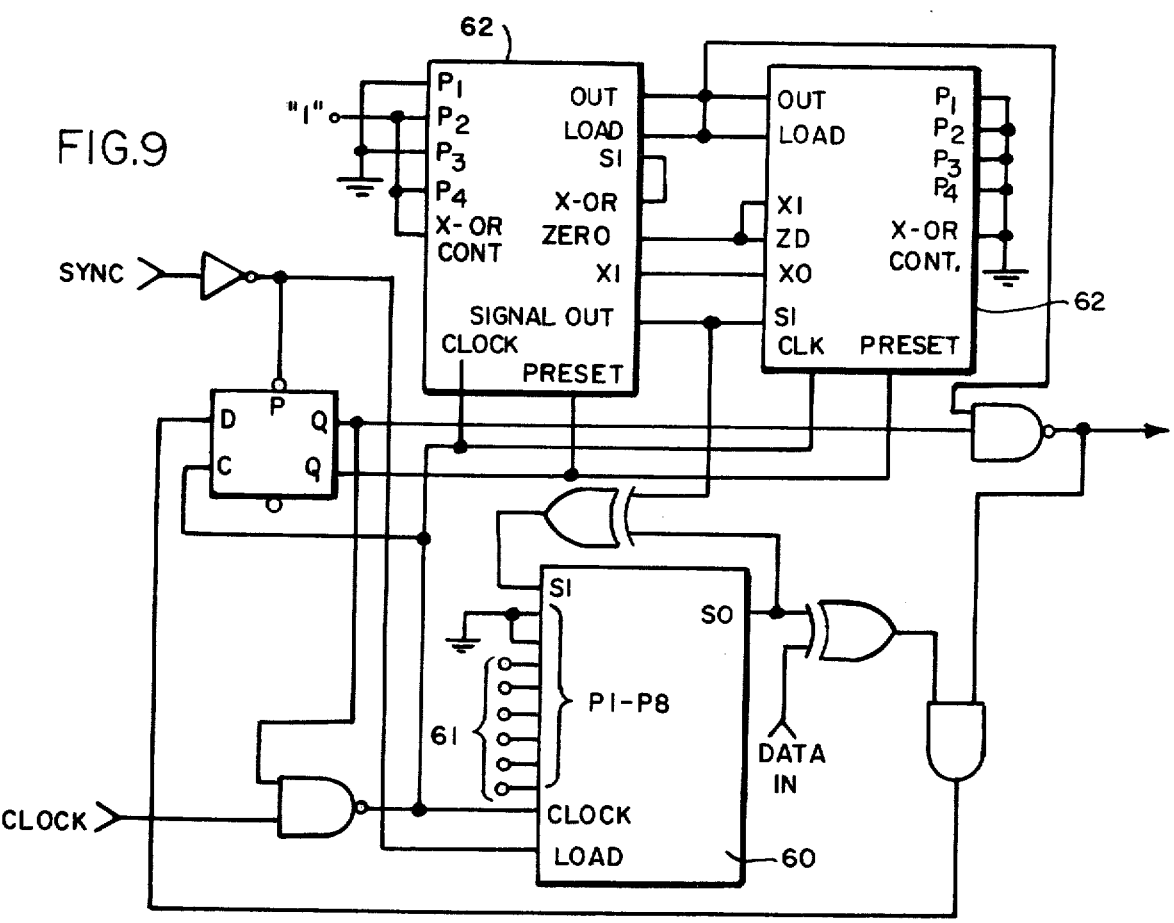
FIG. 9 depicts the logic circuitry of the monitor unit of FIG. 3.

One embodiment of such a monitor circuit 38 is shown in FIG. 9. Such circuitry is a sequential circuit which is tuned to signal the node control unit when stimulated by an appropriate signal to command the node control unit to establish a new inboard side for the node. Such command signal arrives on the future inboard terminal, the monitor circuit 38 connected to such link processing the command signal in a bit serial fashion so that it does not require any memory storage capacity for the entire message content.

Unlike normal node commands, the special command signal for setting up a new inboard terminal of the node unit must contain considerable redundancy in order to minimize the possibility of an erroneous triggering of the monitor circuit 38 which might be exposed to random data from failed portions of the overall network. In the particular monitor circuit 38 shown in FIG. 9a 64-bit coded message is used to specify one of 64 possible monitor circuits throughout the network. The excess redundancy is used to make the particular target monitor circuit address space sparse and thereby minimize the probability of random data triggering the circuit. An 8-bit parallel load shift register 60 of FIG. 9 decodes a command, consisting of eight 8-bit segments. The initial 8-bit segment has two leading zeroes followed by the 6-bit monitor circuit address 61. The remaining seven 8-bit segments are then formed by utilizing the fourth stage of a modulo-64 divider 62 as a bit inversion function as the output of the 8-bit parallel load shift register 60 is fed back into itself. A monitor command of this form is unique to an addressed monitor circuit over any 8-bit segment of the command signal and its bits do not form periodic or cyclic patterns so that it is pseudo-random in nature.

The node control circuitry 37 of node 20 comprises receiver transmitter control circuitry connected to the internal IN and OUT buses of the node plate, discriminator control circuitry and conductivity control circuitry, as shown broadly in FIG. 3, and as discussed in more detail with reference to FIGS. 4, 5, 6, 7 and 8, respectively, the latter figures showing exemplary logic for performing the various node control functions.

Figure 4:
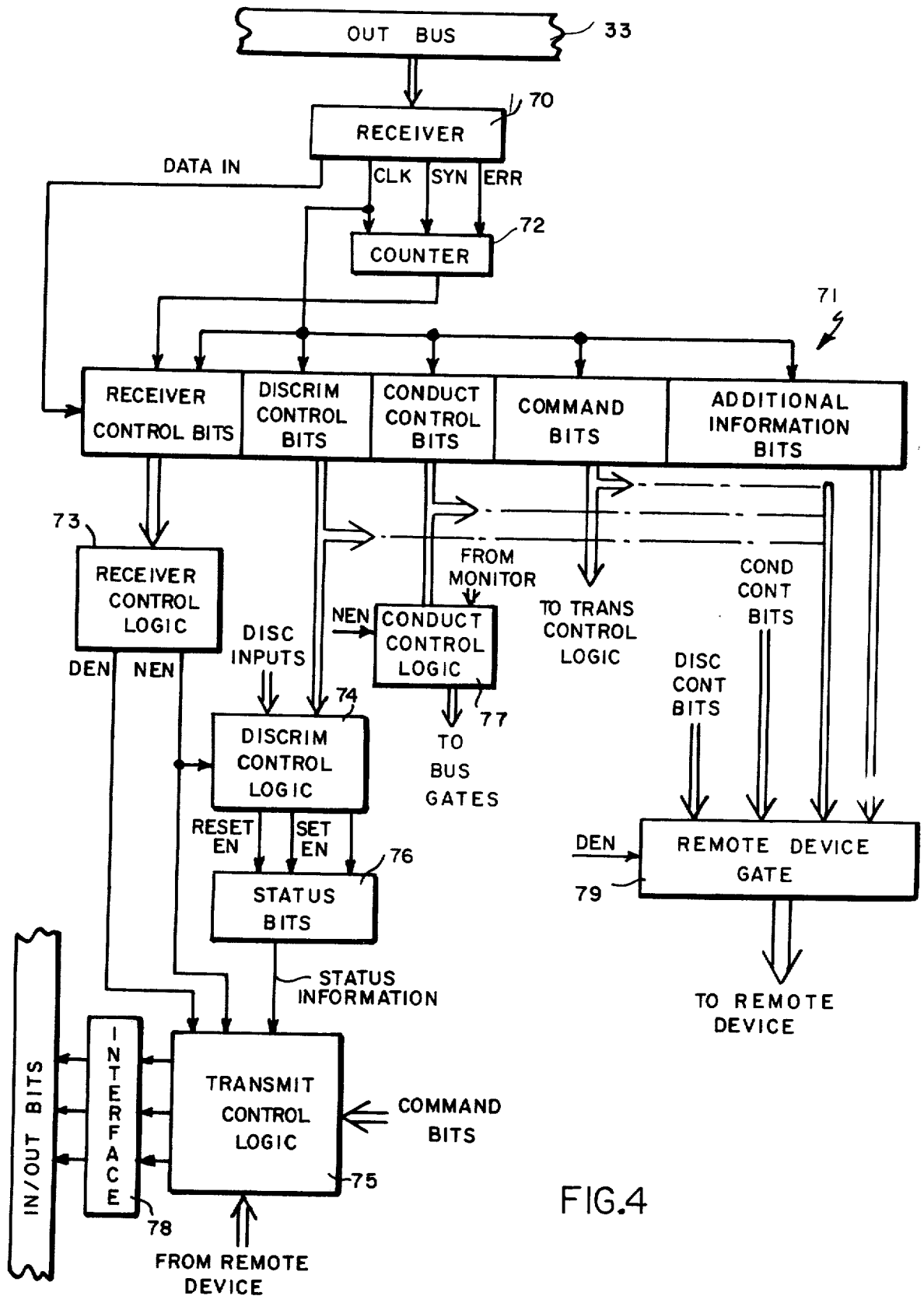
FIG. 4 depicts a more detailed block diagram of the control logic of an exemplary node unit of the network of FIG. 1.

FIG. 4 shows in block diagram form the node control circuitry 37 of FIG. 3, such circuitry being set forth in more detail form in FIGS. 5, 6, 7 and 8. A suitable and conventional receiver interface unit 70 of any appropriate type known to the art receives information that has been placed on the OUT bus 33 from an inboard terminal connected to an outboard side of a link and provides therefrom the input data as well as appropriate timing signals for operating the node. Such latter signals include a suitable clock signal (CLK), a message synchronizing signal (SYNC) and an error signal (ERR). The "Data In" signal is supplied to a shift register, referred to for convenience as an upper shift register 71, and includes both information bits and control bits as shown. A counter 72 is responsive to the CLK, SYNC and ERR signals for controlling the operation of shift register 71 to permit appropriate acquisition and storage of the Data in signal. If the information bits are identified as being intended for a remote device which is serviced by the node unit such information is conveyed thereto as shown.

Receiver control logic circuitry 73 is responsive to the receiver control bits to produce two control signals, one of which, the Data Enable Signal (DEN), is produced when data in register 71 is intended for a remote device associated with the node unit and the other of which, the Node Enable Signal (NEN) is produced for manipulating the status of the node lines for controlling the operation of the remaining control logic circuits of the node control means.

Discriminator control logic circuitry 74 is responsive to the discriminator control bits of shift register 71 and is enabled by the NEN signal. Logic 74 manages control of the discriminators 36 of the node unit, as discussed below, and provides information for the central processor complex concerning the status of the node. Such latter information is appropriately stored in a lower storage register 76 from whence it can ultimately be conveyed to the central processor complex via transmitter control logic 75.

The logic for controlling the operation of the bus gate elements 30 and 31 for the selective placement of data on the IN and OUT buses 34 and 33, respectively, is shown by conductivity control logic 77 which is responsive to the conductivity control bits of shift register 71 as well as the output of monitor 38 and is enabled by the NEN signal as required.

Figure 8:
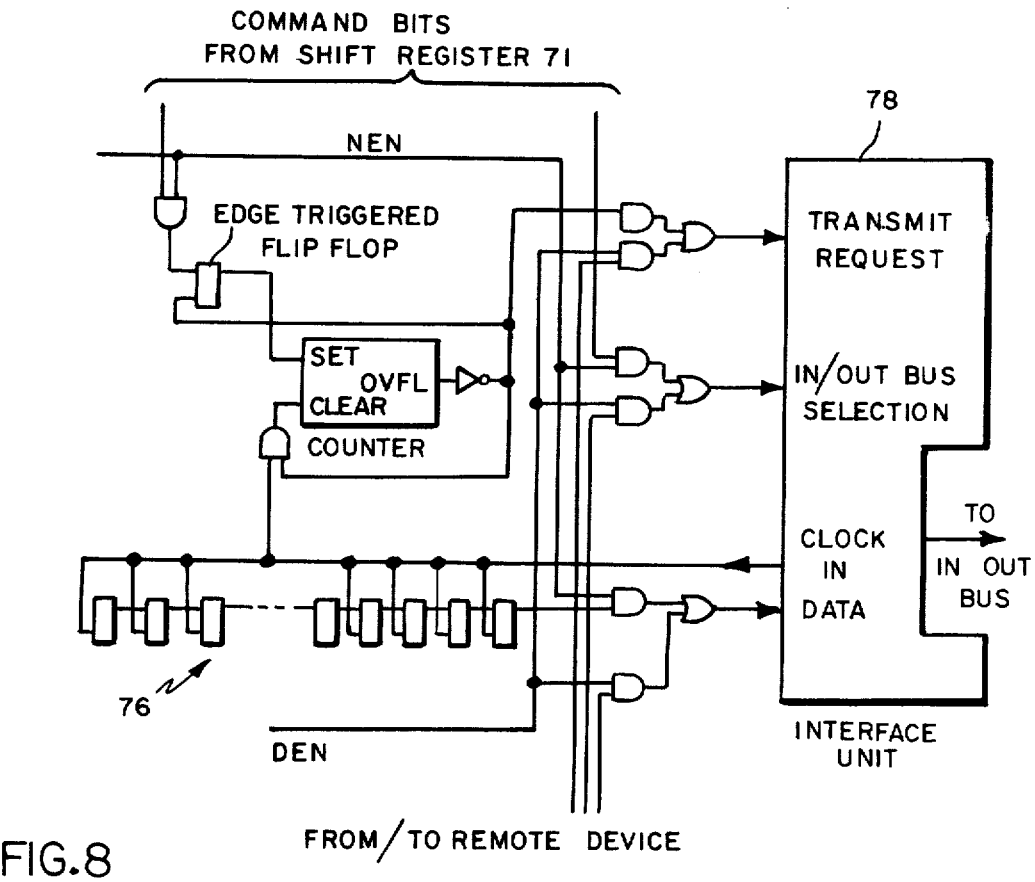
FIG. 8 depicts the logic circuitry of the transmit control logic of FIG. 4.

Certain of the data in register 71 are identified as command bits and are used to control the operation of transmitter control logic 75 FIG. 8 which can be appropriately enabled by the NEN signal, for example, to transmit the status bits to the central control unit or which can be enabled by the DEN signal, for example, to transmit information from the remote device back to the central processor unit. Appropriate transmitter interface means 78 are utilized for selectively transferring the status or remote device information to the appropriate "IN" or "OUT" bus for transmission as desired.

Particular embodiments of circuitry which can be used to implement the logic circuitry 73–77 of FIG. 4 are shown in more detail in FIGS. 5, 6, 7 and 8 as discussed below.

Information which is to be transmitted to a remote device associated with a node is supplied from register 71 (such information may include data bits in the discriminator control, conductivity control and command bit positions as well as in the additional information bit positions, as shown) and is thereupon furnished to the remote device via an appropriate gate 79 which is made operative by the data enable (DEN) signal.

Figure 5:
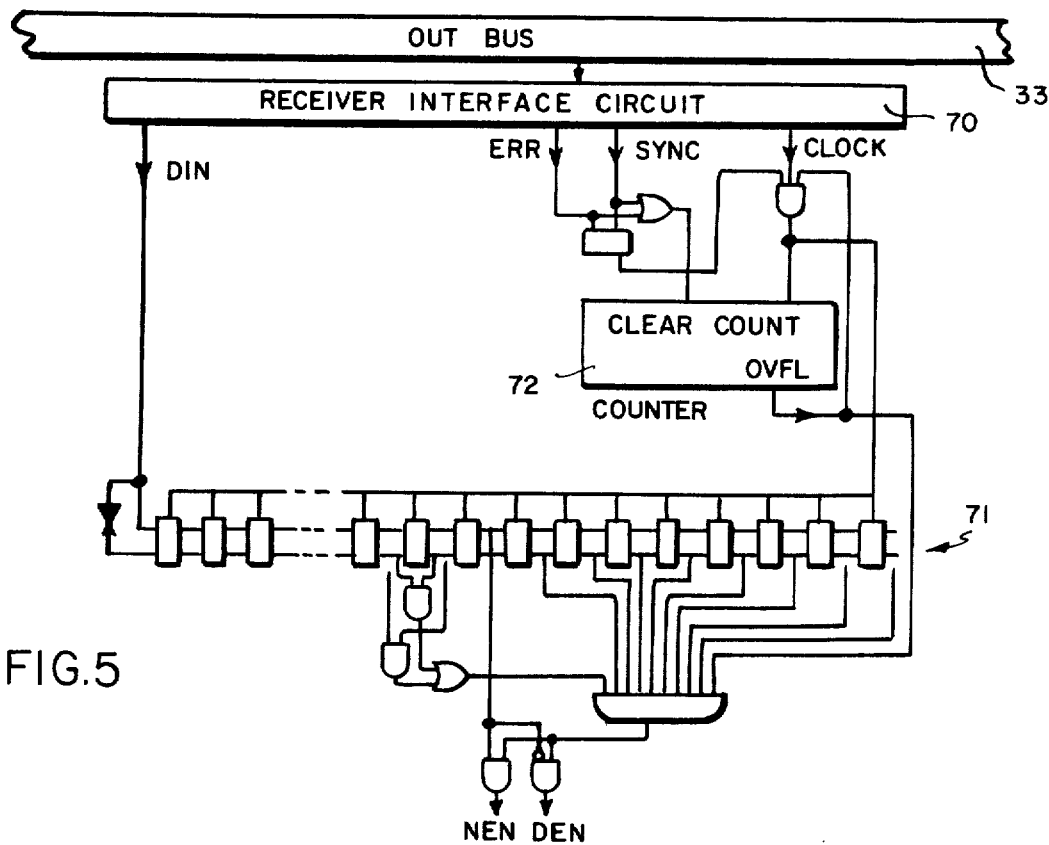
FIG. 5 depicts the logic circuitry of the receiver control logic of FIG. 4.

FIG. 5 shows the receiver interface circuit 70 and remaining receiver control logic which is responsive to the four signals available to the node control unit from OUT bus 33, i.e., the clock signal (CLK), the message synchronizing signal (SYNC), the error signal (ERR) and the Data Input Signal (DIN). The upper shift register 71 is responsive to the counter 72 and stores a first plurality of bits of all outgoing messages which are supplied thereto in the DIN signal. In an exemplary embodiment of the invention, for example, the shift register 71 and counter 72 are arranged to acquire the first 32 bits of all messages arriving at the OUT bus from the outboard side of a link, a first number of bits being examined to determine whether or not they correspond to a remote device which is being serviced by the node control unit. A selected pair of such bits may be used to determine the node plate identification if only a single one of the three node plates is to be addressed (the OO signal of such selected pair may be used if all plates of that particular node unit are to be addressed simultaneously). Another bit may be selected to determine whether or not the data which is being received is a node control message, e.g., a message for changing the status of the node unit, or a message for a remote device. A further selected number of bits may be used to identify the particular node unit of the network to which the message is directed and will depend on the total number of nodes which are utilized in the network. The receiver circuitry will then effectively decode the appropriate input bits to produce, if required, a remote device message enable sinal, identified as the DEN signal, or a node control message enable signal, identified as the NEN signal, depending on which, if either, is so indicated. The NEN signal manipulates the status of the node lines but is not enabled when the data received is for an associated remote device. The DEN signal indicates that the data is for a remote device associated with the node unit. If the node message enable signal is activated, the remaining bits of the shift register containing the message are, accordingly, further processed by the node conductivity control circuitry as discussed below.

Figure 6:
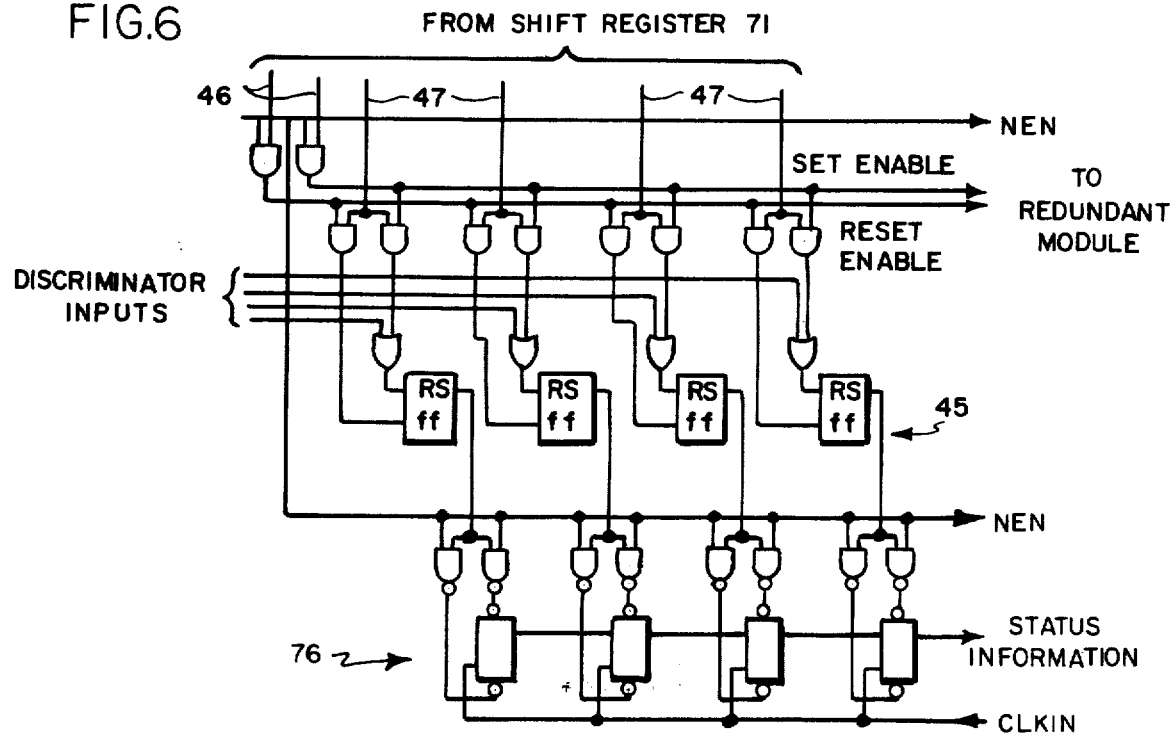
FIG. 6 depicts the logic circuitry of the discriminator control logic of FIG. 4.

Discriminator control logic circuitry is shown in FIG. 6 and manages control of the discriminators 36 of the node unit. In effect the discriminator control logic monitors the status of the node and records error events so that the central control unit can be informed thereof and can take action to control the use of the links associated with the node unit. For example, in the particular embodiment disclosed, the management required is to record any disagreement signals or confused message events and on command report such situations, i.e., status information, back to the central processor complex. The logic shown in FIG. 6, for example, depicts the management of a single discriminator of a single node plate and additional logic of the same type is utilized for each of the remaining discriminators of the same node plate as well as for each of the discriminators of each additional node plate. The discriminator inputs may set any of the bits of a status register 45 directly or the central processing complex may initialize status register 45 by loading the appropriate command into shift register 71. Thus, a certain plurality of bits from upper shift register 71 of FIG. 5 are used to set or to reset any portion of status register 45, a first pair of bits 46 from the central processor, for example, being used to selectively enable the set or the reset function ("SET ENABLE" and "RESET ENABLE" signals) and the remaining bits 47 from the central processor complex being used to specify which bits of the status register 45 are to be set or reset. Lower shift register 76 is slaved to status register 45 to follow the latter except when the node unit is transmitting a reply message back to the central processor complex.

Figure 7:
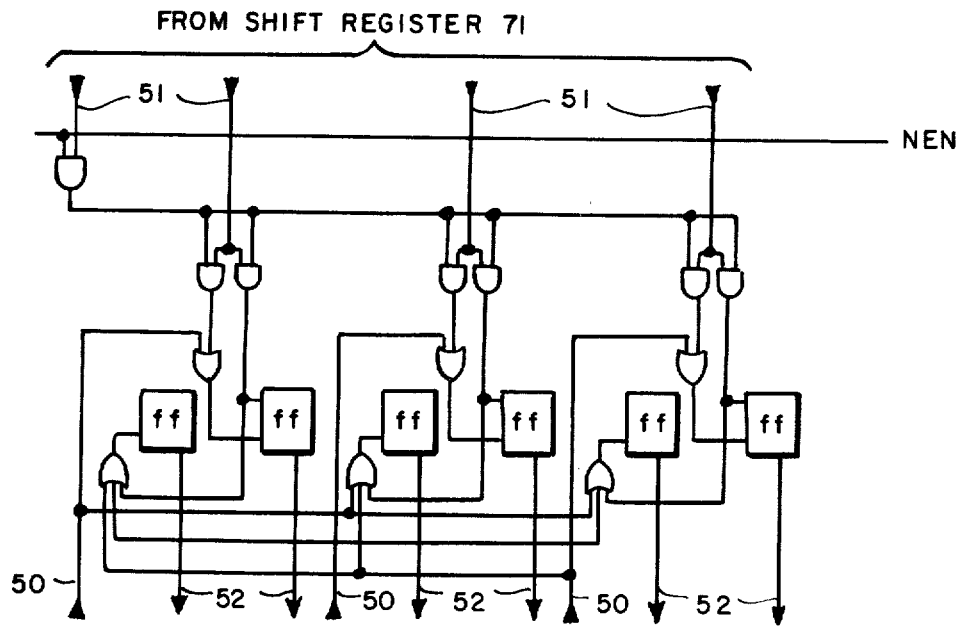
FIG. 7 depicts the logic circuitry of the conductivity control logic of FIG. 4.

FIG. 7 shows the conductivity control logic of the node control means 37 and has effectively two sets of inputs, one set 50 derived from the monitor unit 38 (see FIG. 3) and another set 51 derived from shift register 71 (see FIG. 5). The monitor inputs 50 control the transition of any terminal of the node unit to an inboard status while the inputs 51 from shift register 71 are used to control the outboard and the inactive status of the terminals of the node unit, such controls being achieved via the conductivity control outputs 52 to bus gates 30 and 31 (see FIG. 3 and FIG. 4).

FIG. 8 illustrates the logic whereby messages are formulated and transmitted back to the central processor complex. Under the control of a pair of input command bits from upper shift register 71 which provide a suitable command signal, a selected number of status bits of lower shift register 76 are shifted into an interface unit 78, upon the presence of a node enable signal NEN, for placement on either the IN bus or the OUT bus of the node plate, as required. When a message from a remote device associated with the node unit is required to be transmitted to the central control unit, it is shifted to the appropriate bus when the data enable signal, DEN, is activated, via the interface unit 78 to be carried back to the central processor complex. Information from another node unit which is to be transmitted back to the central processor complex does not depend on the transmission control logic but is directly conveyed from an outboard side to an inboard side of the node plate. The interface unit is appropriately activated for such purposes by a transmit request signal, as shown, and suitable selections of the bus desired for such transmission are achieved by a bus selection signal, as shown. The interface unit may be any suitable interface circuitry known to those in the art for the placement of data on to a bus.

Figure 10:
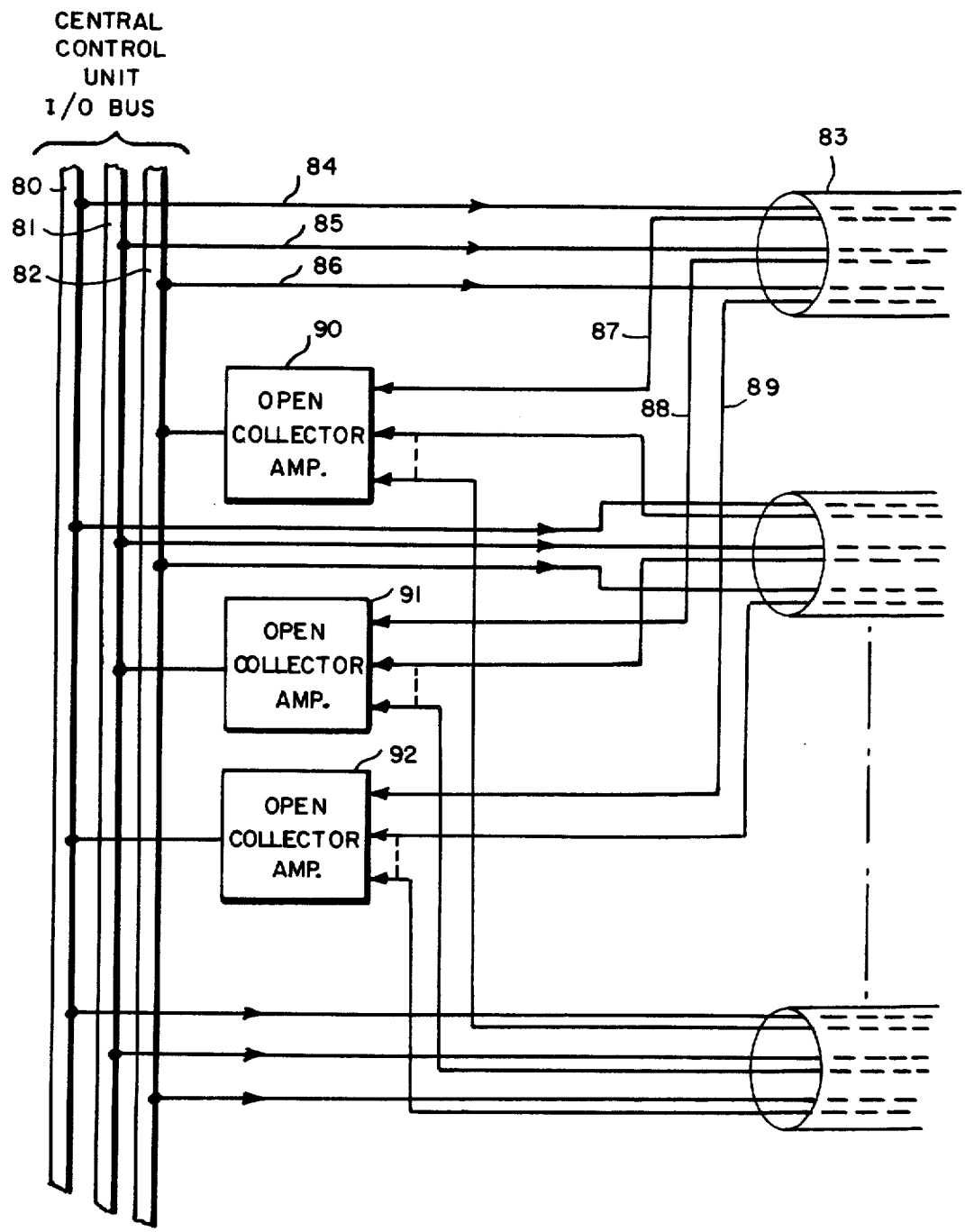
FIG. 10 depicts exemplary interface connections at the input/output (I/O) bus of the central processor complex of the network of FIG. 1.

FIG. 10 shows the connections to the central control unit via the input/output (I/O) bus thereof which permits the processors within the central control unit to be in communication with the remote devices via the linking paths and node units of the network. The central control unit may, for example, be placed within an armored protective region and, in addition to processor units, may include within the central control unit complex one or more peripheral devices which can be located close enough to the processors to be placed within the same armored protection. Direct connections, well within the skill of those in the art, may be made between such peripheral devices and the processors within the central control unit without involving the remote devices, linking paths and node units of the associated network. The peripheral device placed within the central control unit may include, for example, printers, card readers, disk units and tape drives, and the like. Thus, internal arrangements for communication therewith by the processors of the central control complex may be of a conventional nature and can relieve the central processors from the effort of maintaining a larger network without requiring the use of further nodes within the central control unit itself. Thus, the I/O bus, for purposes of redundancy comprises three buses 80, 81 and 82, such buses being available for access thereto by the redundant lines of linking paths as typified by linking path 83, for example, in FIG. 10. Outgoing outlines 84, 85 and 86 of linking path 83 carry data from I/O bus elements 80, 81 and 82, respectively, while incoming data is transferred to the appropriate buses from incoming lines 87, 88 and 89 of linking path 83, for example. Such lines are interfaced with the buses 80, 81 and 82, respectively, via open collector amplifiers 90, 91 and 92 in accordance with conventionally known techniques. Corresponding incoming lines from other redundant links are also appropriately supplied to corresponding open collector amplifiers as shown.

In order to utilize the network approach, as discussed above, effective and appropriate procedures are required. A first such procedure provides the ability to grow, i.e., to organize, a network from an initial stage where no network yet exists, the ability to reconstruct a known network organization, or the ability to repair a damaged network such as by re-growing paths to isolated regions. Such Grow/Re-Grow/Repair procedures are discussed in more detail below. A second such procedure requires an examination of the currently organized network for the purpose of verifying the status of all of the active links therein. Such a Verify procedure is also discussed below. Finally, the network system requires the selective rearrangement, or modification, of certain regions of the network organization in such a way that the rearrangements are in themselves of a minor character and, accordingly, do not involve any major readjustments of the overall network but, accumulatively, such minor modifications routinely activate and utilize all of the links of the network, including inactive spare links, to determine the usable status thereof. Such a Modify procedure which routinely exercises all of the links of the network is also discussed in more detail below.

An appropriate way in which to provide for such procedures to perform the functions described above is to utilize a general purpose computer in the central control complex and appropriately to program such computer using suitable software algorithms which perform the necessary decision making for the management of the network in accordance with the desired functions. A description of each of such procedures is provided herein by the use of the flow charts shown in FIGS. 11 through 18 which set forth the steps required for providing the Grow, Verify and Modify routines. It is well within the skill of those in the computer arts to utilize such flow charts in devising suitable programs for use in general purpose computers as, for example, a mini-computer of the type such as that made and sold by Data General Corporation of Southboro, Mass., under the designation NOVA 800. Such programs are in general relatively straightforward and well within the skill of those in the art. As a helpful adjunct to the descriptions of the routines in the flow charts mentioned above, it is helpful to explain the program logic with reference to the network data base which must be referenced by the management level routines, i.e., the types of information which the management routines collect.

The network data base consists essentially of two regions, a first, static region which stores the basic, physical organization of the network and a second, non-static region which is used to record the transient conditions of the network. Thus, for example, for the static region can store the fact that a particular side of a node is joined by a link to a specified side of another node, while the non-static region can store information, for example, as to whether a link between two nodes is active or inactive and, if active, which is the inboard side thereof.

The static storage area may be organized by node number. The specific information which must be stored includes the total number of nodes (NODE_NUMB), the number of direct connections to the processor PROC_NUMB), and the physical connections between the nodes and between the nodes and the processor. In the latter cases, a two-dimensional array NODE(I,J) is used to store information and the connections between nodes. For example, a 12 stored in NODE(17, 2) would indicate that node 17, side 2 is connected to NODE 12. A zero would indicate a direct connection to the central processor complex. A further array PROC(J), stores the list of nodes which are connected directly to the central control processor complex. It is clear that in a relatively large network the major bulk of static storage is devoted to storage of information as to the NODE array.

In a manner similar to that for the static region, the non-static region of the data base is organized by node number. Information on the assigned state of each node is stored in an array NODE_STATE($i, j$) where $i$ is the node number and $j$ is the node side. An element of NODE_STATE contains a O for the inactive state, a 1 for the inboard state or a 2 for the outboard state. A similar array PROC_STATE($j$) contains the state of all sides of the central processor complex which can be treated as a pseudo node. Links leaving the central processor pseudo node can only have either an inactive or an outboard state, as is clear from FIG. 1. Information on the diagnosed status of each link is stored in an array LINK_STATUS($i,j$) or PROC_STATUS($j$). Elements of these arrays contain a code giving the diagnose fault status of the specified link. No effort is made to distinguish between node failures and link failures, the functioning of the node being clustered with the functioning of the links so that a node failure would appaear as a failure of all the links into or out of that node.

Figure 11:
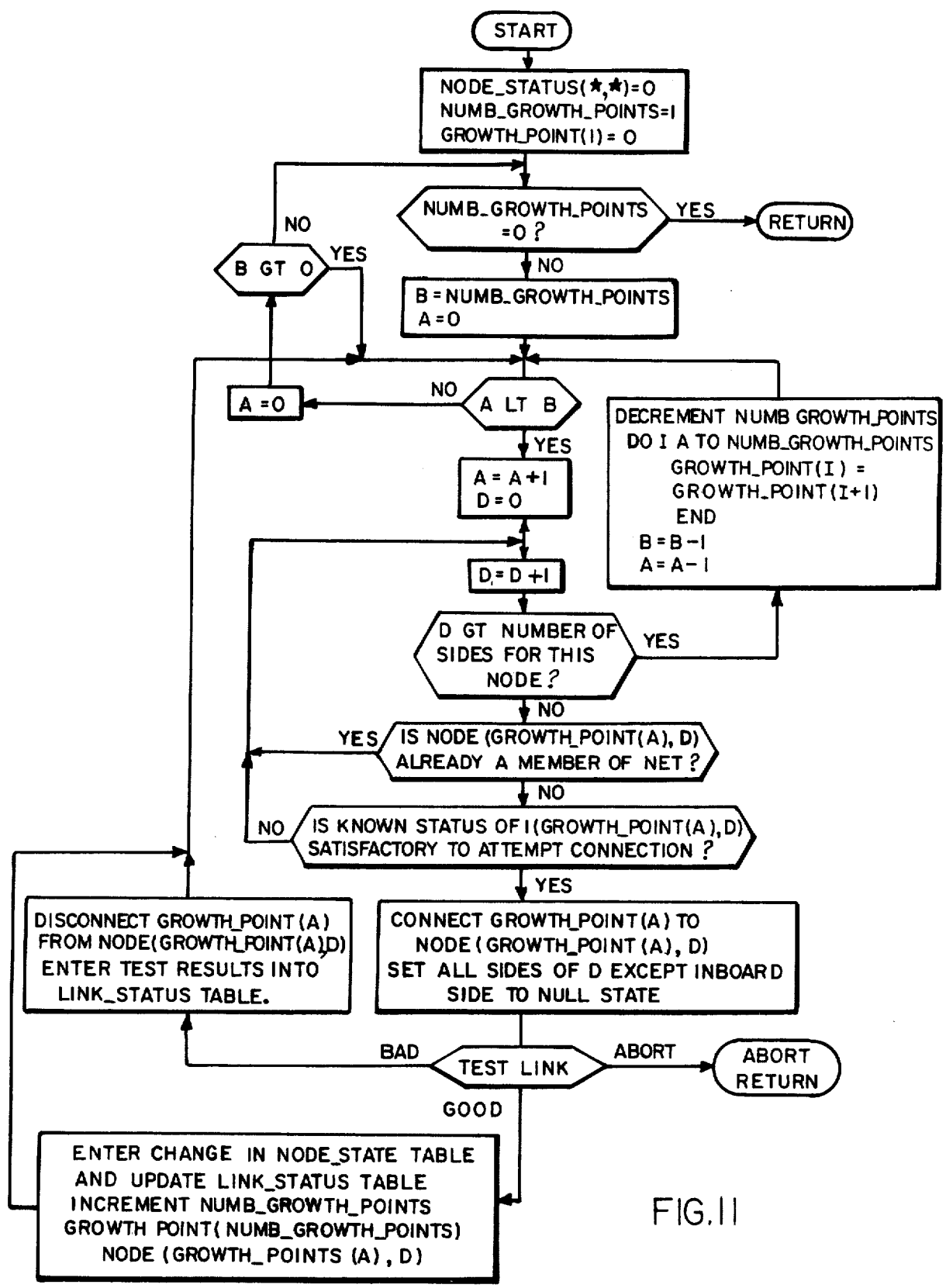
FIG. 11 depicts a flow chart of a basic GROW routine for organizing an uninitialized network into a functioning network system in accordance with the invention.

The above information with respect to the data base storage permits a better understanding of the flow charts of FIGS. 11 through 18 which are discussed below. The flow chart of the basic Grow routine (which can, with appropriate variations, be modified to provide for Re-Grow and Repair procedures) is shown in FIG. 11.

The Grow function is used to organize an uninitialized network into a functioning network system, the network in effect being organized from a start at the central processor complex pseudo node so that the network grows root-like data paths to all the nodes of the network. The exact location of the node units is stored in array GROWTH_POINT(i) and the total number of such locations is specified by NUMB_GROWTH POINTS. The Grow routine is initialized from a single basic growth location, i.e., the location of the central processor unit pseudo node. Attempts are made to grow roots out of all the links from a Growth location and the Growth location becomes exhausted when the central processor complex has used all such links or when it discovers that any remaining unused links are faulty or connect to a node which is already a part of the root structure. When a growth location is exhausted, it is removed from the GROWTH_POINT table and the NUMB_GROWTH_POINTS is decremented by one. Conversely, when a root is extended to a new node, that node is added to the GROWTH_POINT table and the NUMB_GROWTH_POINTS is incremented. When NUMB_GROWTH_POINTS shrinks to zero, every node within that link is connected to the processor or else cannot be reached. Accordingly, the nodes are connected to the central processor pseudo node by the shortest possible path, that is, by the fewest possible nodes between them and the central processor pseudo node. Nodes which are not part of the root structure are faulty in themselves or lie in a portion of the network which is inaccessible due to faults within the network. The flow chart for such a Grow routine is shown in FIG. 11.

The Re-Grow procedure is closely related to the Grow routine. While the Grow routine attempts to use all available links when setting up the network, the Re-Grow routine restricts itself to each of those links which were active in the network configuration it is trying to copy. Thus, Re-Grow will start at the central processor pseudo node of the network and grow outwardly along the routes specified by the NODE STATE array of the network it is trying to copy. Since the actual NODE_STATE array will change as Re-Grow proceeds, it will be necessary that a copy of the NODE_STATE array of the model network configuration to be copied be stored in some temporary location.

The purpose of a Re-Grow routine is to provide a continuity of network organization in the face of network interruptions such as power failures and the like. If, however, faults occur during the interruptions, it may be impossible for the Re-Grow routine to completely reconstruct a previous network configuration which existed prior to interruption. If the fault does so arise, the Re-Grow routine discovers such faults and, accordingly, the simplest practice upon such discovery is to arrange for an abandonment of the Re-Grow routine and the establishment of an entirely new network organization via the Grow routine.

The Repair routine follows substantially the same logic as the Grow routine except for the initialization segment. While the Grow routine is initialized from a single growth point, i.e., the central control unit pseudo node, the Repair routine can be initialized from many growth points, a list thereof being created as in the following fashion. First, the central processor complex makes a list of those nodes which have become isolated from the central control unit and then examines the static data base to determine if any of the isolated nodes has a link which connects to nodes within the undamaged portion of the network. All nodes of the intact portion of the network discovered by such procedures become members of the initial growth point table. These initial growth points are seen to be all those nodes which border on the isolated region of the network. From this point in the routine forward, the Repair routine follows the logic of the Grow routine exactly. Such procedure quickly re-establishes routes into the isolated regions of the network making contact with all accessible nodes.

The Grow routine may also be utilized to repair a fault in the network as a substitute for a Repair routine by completely regrowing the network from scratch.

Figure 12:
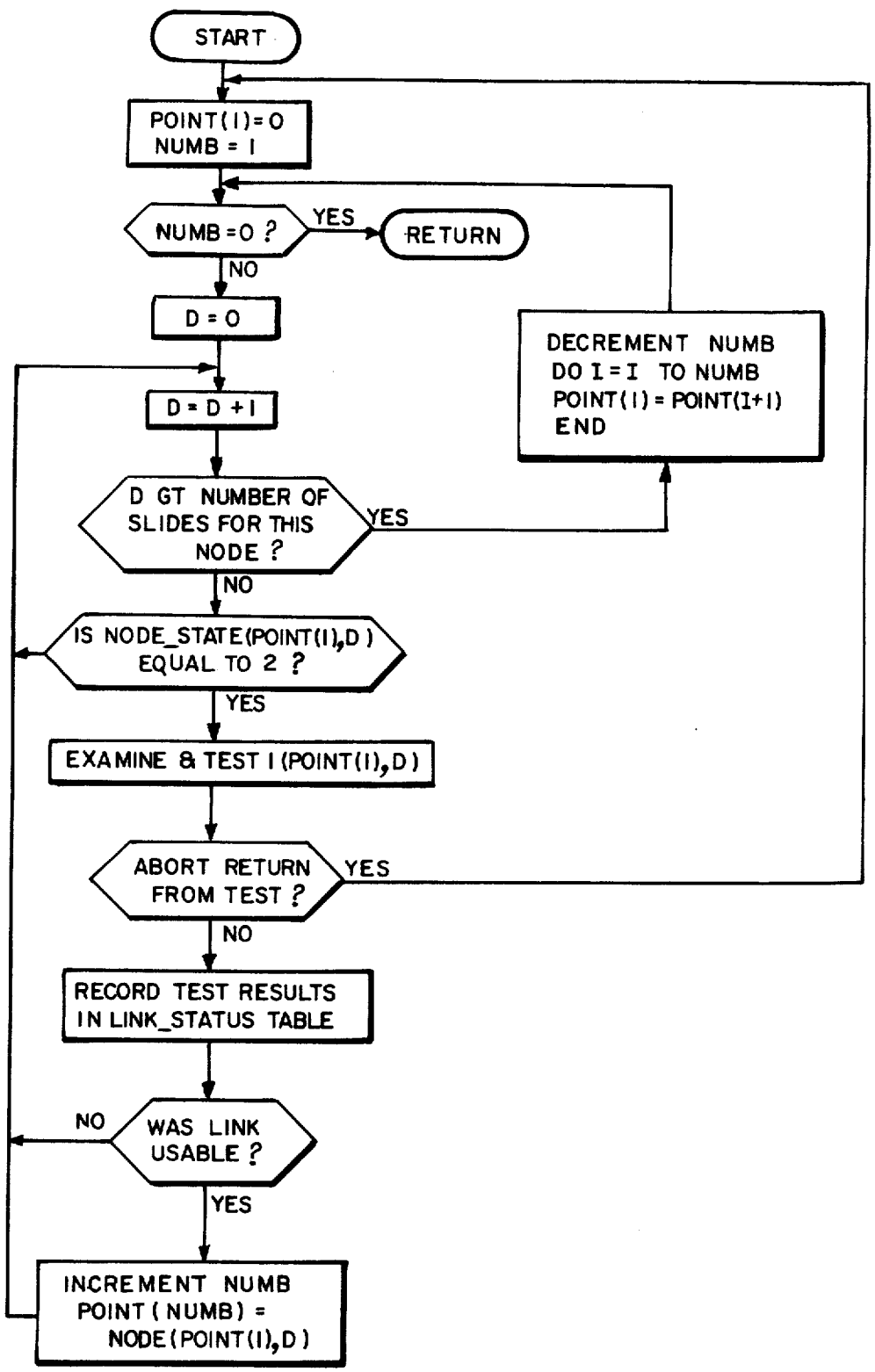
FIG. 12 depicts a flow chart of a basic VERIFY routine for determining the status of active links of a network system in accordance with the invention.
Figure 13:
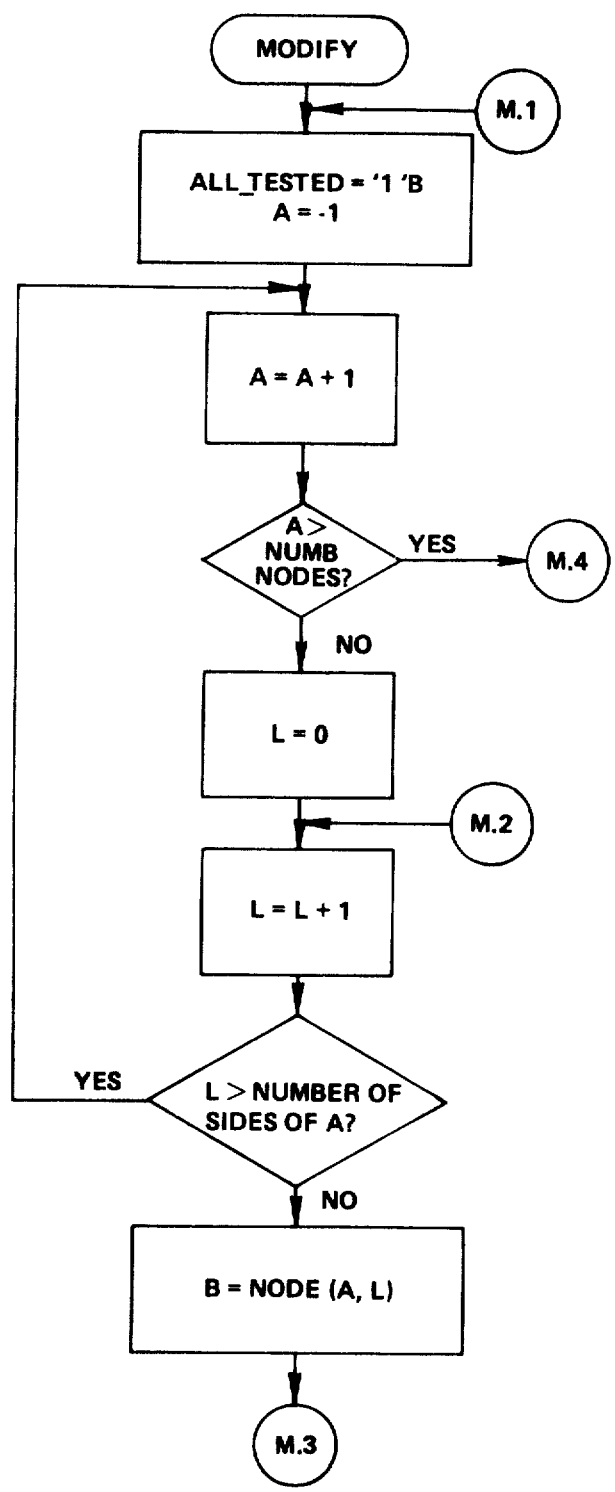
FIGS. 13-18 depict a flow chart of a basic MODIFY routine for reconfiguring a network system in accordance with the invention.
Figure 14:
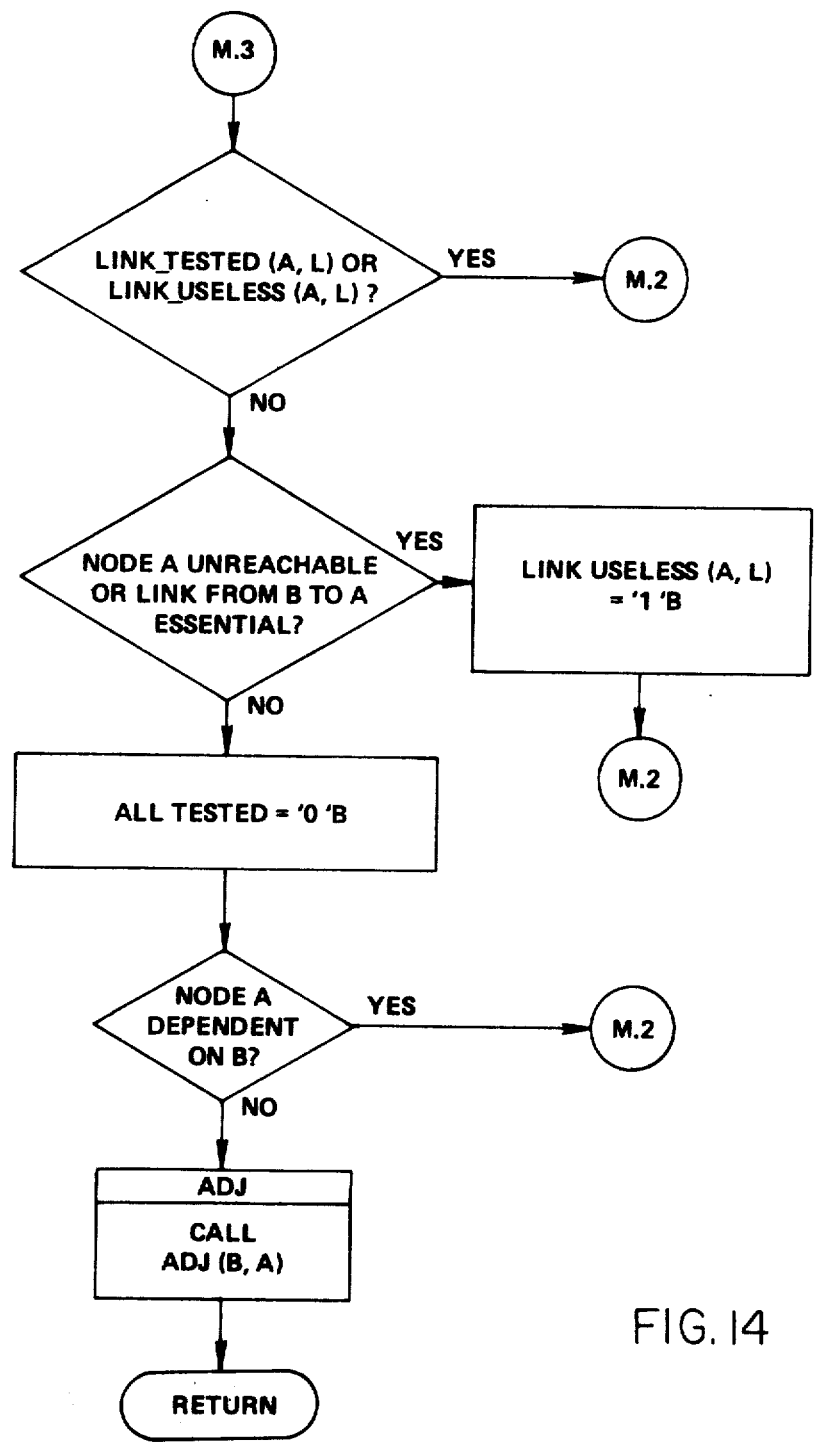
Figure 15:
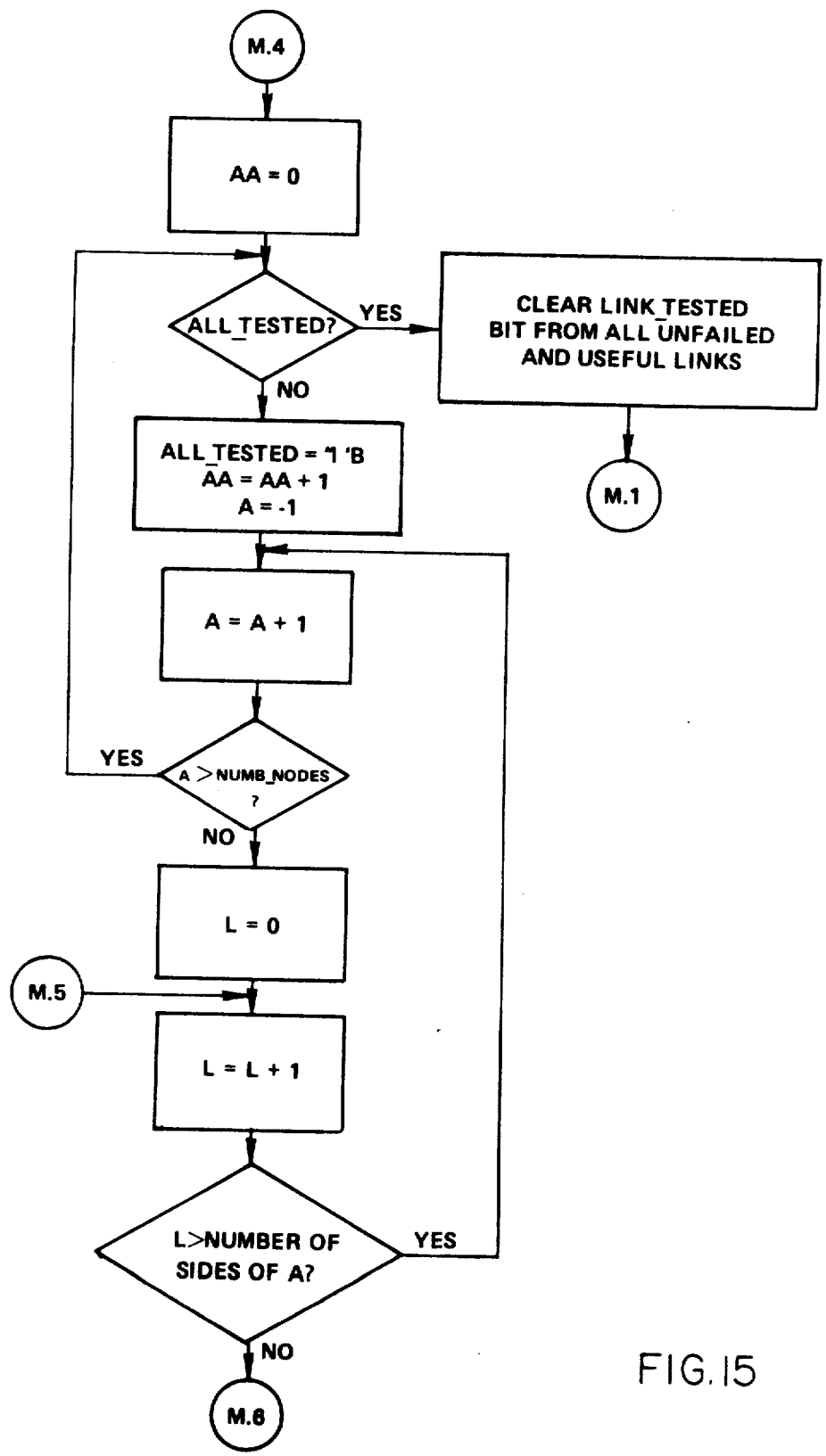
Figure 16:
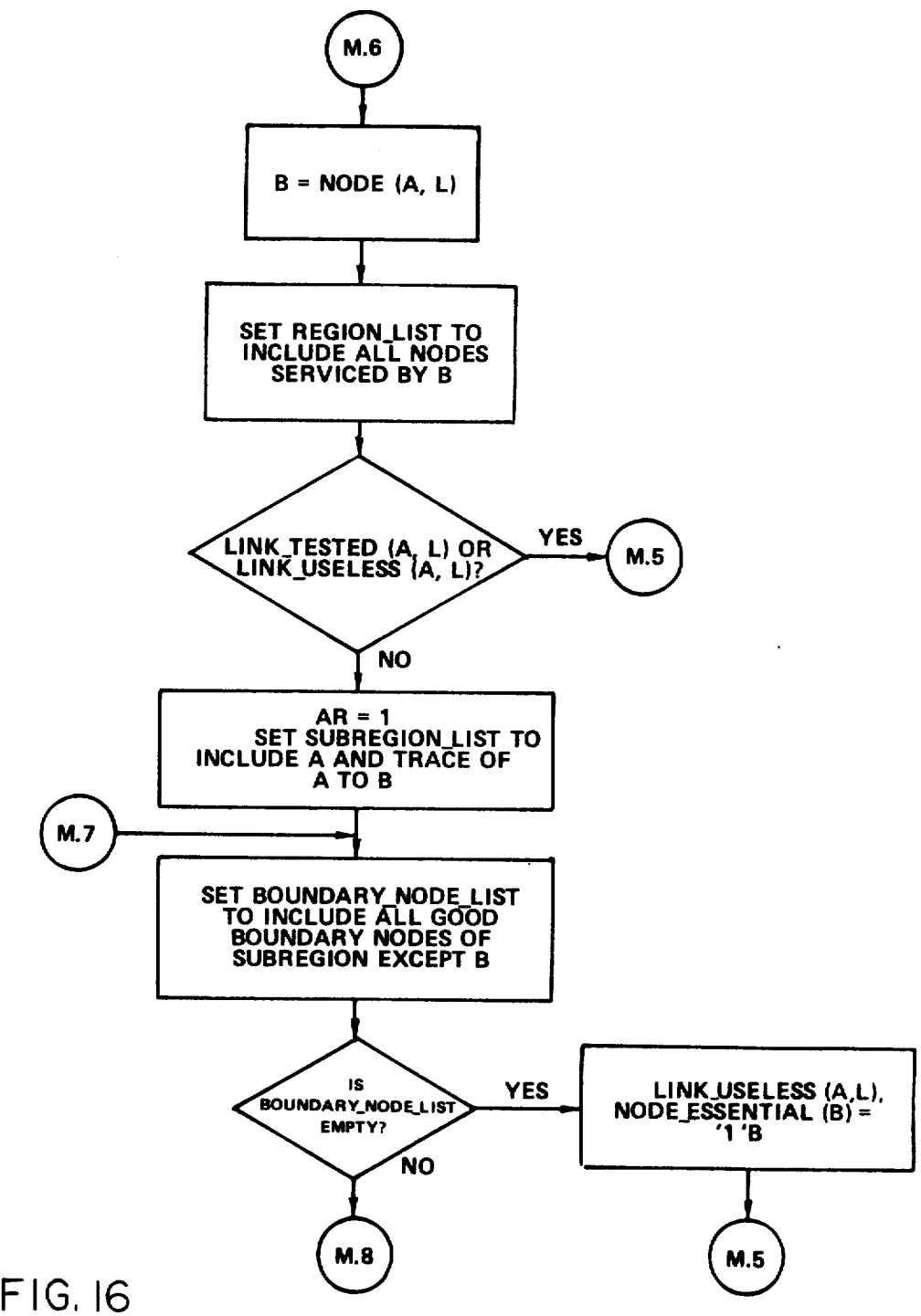
Figure 17:
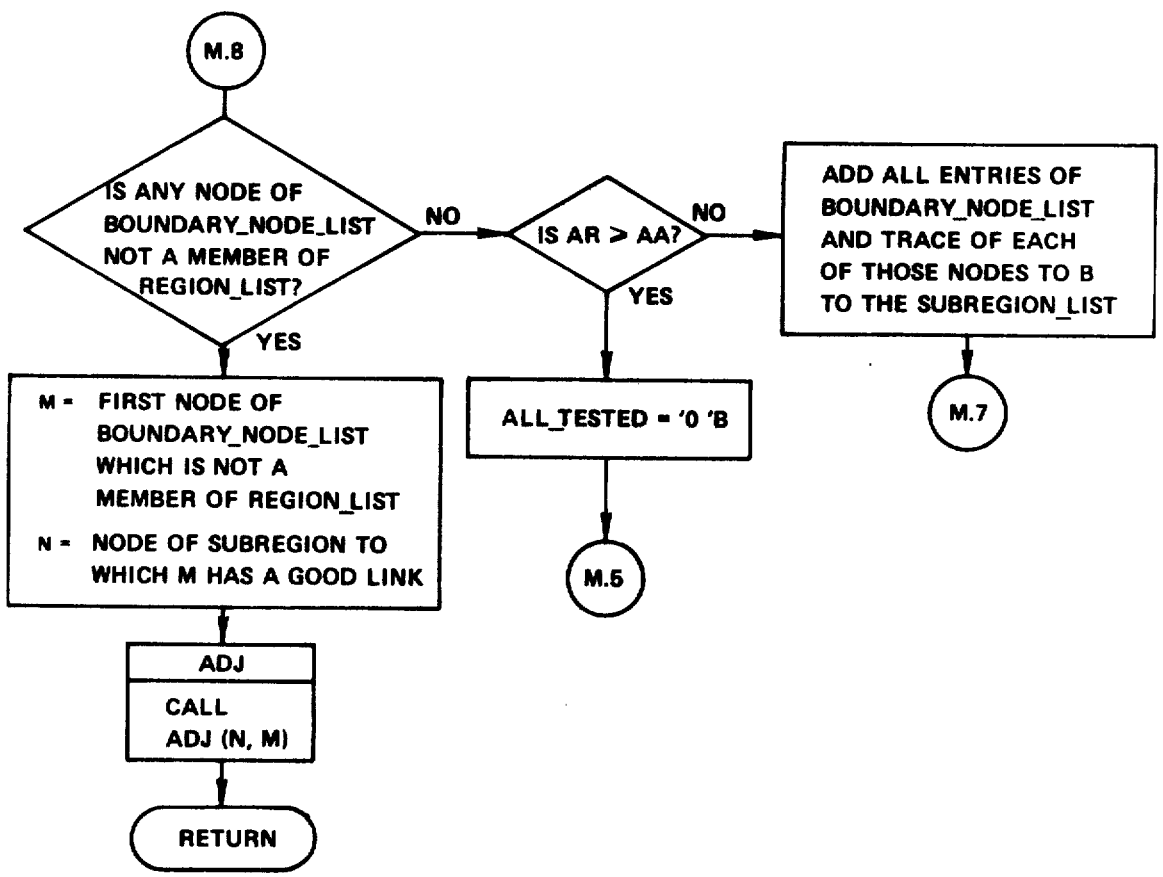
Figure 18:
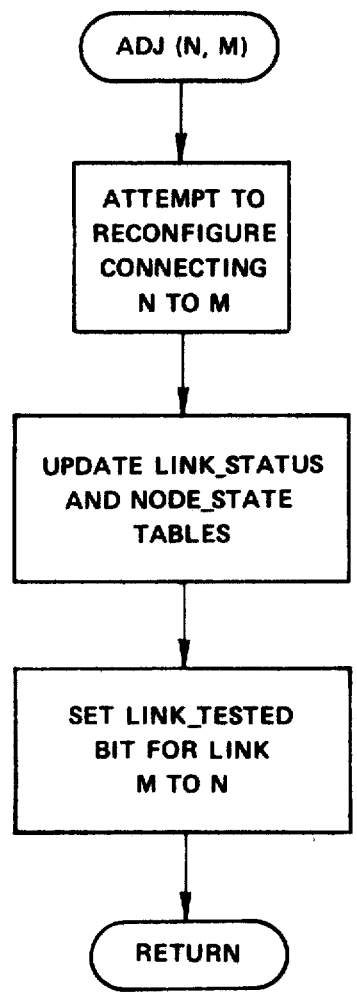

A flow chart of the Verify routine is shown in FIG. 12 and is responsible for scanning the network and determining the status of all active links of the current network organization. The basic approach utilized by such routine is to examine each link of the network, starting at the central control pseudo node, and to move outward therefrom to determine if the error latches associated with that link have noted an error and then to subject them to testing so as to determine if they are still functioning properly.

The examination of the status of the error latches before actively testing the link provides a means of determining if an error has occurred in that link since the Verify routine last checked it. Such a process is particularly useful for pinpointing the sources of transient errors which may not reveal themselves during the active test. The Verify routine essentially reconfirms a decision to include a link in the network organization, which decision was previously made by a Grow/Regrow/Repair routine. The results of the observations made during the Verify routine are entered into the LINK_STATUS table.

When a fault in the network is discovered, the system must recycle using the Grow or Repair procedures to correct the flow. Most of the system faults can be corrected by disconnecting the faulty link and using the Repair routine to grow new routes to any nodes which are isolated. In severe cases it may be necessary to use a Grow routine rather than a Repair routine, particularly under conditions where exact pinpointing of the error source is not possible. Such a Grow routine implicity will correct any faults when it establishes a new network organization because the Grow routine immediately disconnects from the faulty node whenever it tries to grow a root to it. Accordingly, the fault is thereby isolated from the system when the network is re-established.

The Verify routine is continually re-run on a regular schedule but it also may be invoked by a communication routine which notes an error and desires that the Verify routine be utilized to locate the source of the error and correct. The Verify routine then finds the fault and in turn invokes the Grow/Repair routine to correct the fault.

The Verify routine does not affect the network organization but merely scans it for a fault. Thus, it is possible to maintain normal communications with remote devices at the same time the Verify routine is being executed.

The third major routine for exercising all the spare links of the network is the Modify routine which is used to determine the degree of redundancy which is available to the overall network system.

For example, the network organization may remain static until the existence of a fault forces the network to be reconfigured by a Grow/Regrow/Repair routine. The ability to so reconfigure the network is dependent upon the adequate performance of the alternate, or spare, data links and, if such alternate linking paths have not been tested, it is possible that they may have failed during their inactive status and that any reconfiguration attempt which requires their use will also fail. Because of the nature of the network, links may be either active and, therefore, in use or inactive and, therefore, idle. In order for the system to function correctly, only specific sub-sets of the available links are active at any one time and attempts to activate any specific link for the purpose of testing it may require considerable readjustment to other links within the system. Thus, in order to accomplish a desired goal, many linking paths may need to be activated or inactivated and, except when growing or repairing the network, changes to the network configuration require that at least one link be de-activated for every link which is activated. Such a process of de-activating one link and activating another to replace it is called an "adjustment". An extensive reorganization of a network may involve many such adjustments, the desired adjustments in many cases requiring extra adjustments which are necessary in order to achieve the desired ones. The ratio of the total adjustments required to the desired adjustments can be thought of as an overhead factor. The Modify routine is arranged so as to minimize or eliminate the overhead factor by selecting relatively easily implemented adjustments while maintaining the overall goal of eventually cycling through all of the links in the system. The logic flow chart set forth in FIGS. 13–18 fully describes the method by which the Modify routine selects adjustments.

Thus, the program is designed to effect only one adjustment per call and can be integrated into the overall software as a routine which is periodically called. Any single call causes a minimum of disruption to the overall network while the continuing series of calls insures the testing of all the links of the network. Typical cycling of the Modify routine may be arranged to place little strain on the central processor complex's time resources. For example, for a network having two hundred links, and an overhead factor for the Modify routine of 1.5, three hundred calls to the Modify routine are required to test all the links in the system. If the basic cycle time for a complete test is set up as 15 minutes, the Modify routine must be called once every three seconds.

Basically, the Modify routine makes, or attempts to make, one adjustment to the network each time it is called. If possible, it selects an adjustment which would activate a previously untested and useful link of the system. If the attempt fails due to a fault within that link, the status of the link is changed to a "tested and failed" status and the system is restored to its previous state. If the attempt succeeds, the now active link is left in service and subjected to routine use by the system. During this routine use, it is thoroughly tested and its status is changed to "tested" and reflects the test results. Often, however, the Modify routine is unable to make a single adjustment which activates a useful untested link and, under such circumstances, it attempts to make an adjustment which moves the system toward that goal. Several calls are then required to achieve a productive modification.

The Modify routine always selects an adjustment which is the first of a shortest series of adjustments ending in a worth-while adjustment. Assuming an unchanged network between calls to the Modify routine, this procedure assures a steady progress towards a worth-while adjustment. The flow chart logic of the Modify routine assures that all the untested links that are not useless are eventually activated and tested. Once this is done the "link tested" bit is cleared from the LINK_STATUS table entries for all of the functional and useful links and the retesting of all links is begun.

Accordingly, the three major routines discussed above, namely the Grow/Regrow/Repair routine, the Verify routine and the Modify routine, provide for operation of the network such tha the network can be established or re-established in the face of a fault or other desired reconfiguration. The status of the link can be verified to determine the redundant characteristics of the network and the spare links of the network routinely exercised to test the status thereof in an active way.

What is claimed is:

1. A network providing for digital data communication among a plurality of separate data handling units comprising
    a central processing and control unit;
    a plurality of said data handling units remote from said central processing and control unit;
    a plurality of node units, each node unit being associated with at least one of said remote data handling units, each node unit having at least one terminal, the terminals of each said node unit being made available for connective communication with one or more of the others of said node units or with said central processing and control unit;
    a plurality of duplex communication links for interconnecting said node units with each other and with said central unit;
    means for activating a selected number of said communication links, one end of each said activated link being designated as an inboard side of said link and the other end thereof being designated as an outboard side of said link;
    means for selectively assigning an inboard status to terminals of said node units connected to an outboard side of an activated communication link, an outboard status to terminals of said node units connected to an inboard side of an acitvated communication link, and an inactive status to terminals connected to a non-activated communication link; and
    means for effecting outbound communication channels from said central processing and control unit to selected node units, which channels traverse said links from inboard sides to outboard sides, and inbound communication channels in the reverse direction and for effecting outboard and inboard communication channels which traverse said links between selected node units for providing an interconnected network configuration in which each node unit and the at least one remote data handling unit associated therewith are in duplex communication with said central processing and control unit through a unique non-loop forming path comprising at least some of said activated communication links, the number of terminals made available at each said node unit being selected so that, if one or more of said activated communication links become inoperative, one or more of said non-activated communication links can be activated and said duplex communication can be reliably maintained.

2. A network in accordance with claim 1 wherein each of said node units includes
    a node control means for controlling the flow of data within and through said node unit; and
    internal bus means for transferring data within said node unit.

3. A network in accordance with claim 2 wherein said node control means includes
    means for selectively transferring incoming data at an inboard terminal of said node unit to at least one outboard terminal of said node unit or to a remote device associated with said node unit and for selectively transferring incoming data at an outboard terminal of said node unit and data from a remote device associated with said node unit to an inboard terminal of said node unit.

4. A network in accordance with claim 3 wherein said internal bus means includes and IN bus and OUT bus; and
    said node control means controls the flow of data within said node unit such that incoming data at an inboard terminal of said node unit is placed on said OUT bus, outgoing data for transfer to an inboard terminal of said node unit is placed on said IN bus, incoming data at an outboard terminal of said node unit is placed on said IN bus, and outgoing data for transfer to an outboard terminal of said node unit is placed on said OUT bus.

5. A network in accordance with claim 4 wherein each of the terminals of each of said node units has at least one incoming data line and an outgoing data line;
    said node unit further including a plurality of gating means interconnecting the incoming and outgoing lines of each of said terminals with said bus means and selectively enabled by said node control means for controlling said flow of data through said unit.

6. A network in accordance with claim 5 wherein said node control means includes
    conductivity control means for controlling the conductivity of said gating means so as to place each of the terminals of said node unit in a selected status thereby to control the flow of data within and through said node unit; and
    receiver control means for generating a first enabling signal in response to incoming information to said node unit for enabling said conductivity control means to gate said incoming information to another terminal of said node unit in accordance with said selected status.

7. A network in accordance with claim 6 wherein said node control means further includes
    means in said receiver control means for generating a second enabling signal in response to incoming information to said node unit; and
    transmission control means for controlling the placement of information concerning the operating status of said node unit and information from a remote device associated with said node unit on to an inboard terminal of said node unit for transfer to said control unit;
    said first enabling signal enabling said transmission control means when said operating status information is to be transferred to said central unit;
    said second enabling signal enabling said transmission control means when said information from a remote device is to be transferred to said central control unit.

8. A network in accordance with claim 7 wherein said node unit further includes a plurality of monitor means, one associated with each terminal of said node unit, each said monitor means being responsive to incoming data from said central unit for providing an inboard status control signal when said incoming data contains instructions for placing its associated terminal in an inboard status;

said conductivity control means being responsive to said inboard status control signal for controlling the gating means associated with said terminal to place said terminal in said inboard status.

9. A network in accordance with claim 8 wherein said communication links each include a plurality of redundant lines capable of carrying redundant incoming serial data information streams to each terminal of said node unit; and each said terminal includes discriminator means connected to said redundant lines for providing a single corrected serial data information stream as an output signal; and each said monitor means responsive to the discriminator output signal at its associated terminal.

10. A network in accordance with claim 9 and further including a plurality of additional node units corresponding to said plurality of node units, to form a plurality of redundant node units;

a plurality of additional communication links corresponding to said plurality of communication links to form a plurality of redundant communication links, corresponding ones of said redundant communication links being associated with corresponding terminals of corresponding ones of said redundant node units.

11. A network in accordance with claim 1 wherein said central control unit includes programmable means for producing network formation control signals for activating selected communication links and for assigning an inboard status, an outboard status, or an inactive status to selected terminals of said node units thereby establishing a network configuration in accordance with said control signals.

12. A network in accordance with claim 1 wherein said central control unit includes programmable means for producing network verification control signals for verifying the active status of all activated communication links in said network.

13. A network in accordance with claim 1 wherein said central control unit includes programmable means for producing network modification control signals for selectively rearranging the configuration of activated communication links of said network such that, over a predetermined time period, each of said communication links of said network is activated at least once.

* * * * *